(12) United States Patent
Barna

(10) Patent No.: US 8,817,471 B2
(45) Date of Patent: Aug. 26, 2014

(54) OVERHEAT SUPPRESSION SYSTEMS AND METHODS FOR AN ELECTRICAL HOUSING

(75) Inventor: Kyle Steven Barna, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 393 days.

(21) Appl. No.: 13/297,873

(22) Filed: Nov. 16, 2011

(65) Prior Publication Data

US 2013/0120102 A1   May 16, 2013

(51) Int. Cl.
*H05K 7/20* (2006.01)
*A62C 37/36* (2006.01)
*A62C 3/16* (2006.01)
*H02G 3/03* (2006.01)

(52) U.S. Cl.
CPC . *A62C 3/16* (2013.01); *A62C 37/36* (2013.01); *H02G 3/03* (2013.01)
USPC ........... 361/692; 361/678; 361/691; 361/698; 174/15.1; 174/547; 220/4.02; 312/409; 109/31

(58) Field of Classification Search
USPC ...................... 361/676–678, 679.46–679.54, 361/688–722, 752, 796, 831
See application file for complete search history.

(56) References Cited

U.S. PATENT DOCUMENTS

| | | | |
|---|---|---|---|
| 4,223,175 A | | 9/1980 | Crew et al. |
| 4,307,813 A | | 12/1981 | Palmer |
| 4,667,840 A | | 5/1987 | Lindsey |
| 6,158,833 A | * | 12/2000 | Engler .......................... 312/409 |
| 6,252,167 B1 | | 6/2001 | Rose |
| 6,548,753 B1 | | 4/2003 | Blackmon, Jr. et al. |
| 6,597,571 B2 | | 7/2003 | Kubota et al. |
| 7,545,639 B2 | * | 6/2009 | Ridge ............................ 361/690 |
| 7,843,689 B2 | * | 11/2010 | Moore et al. .................. 361/690 |
| 7,880,097 B2 | | 2/2011 | Moore et al. |
| 8,474,386 B2 | * | 7/2013 | DelloRusso, Jr. ............... 109/80 |
| 8,498,113 B2 | * | 7/2013 | Tran et al. ..................... 361/688 |
| 8,570,719 B2 | * | 10/2013 | Cleveland ................ 361/679.02 |
| 8,605,414 B2 | * | 12/2013 | Moore et al. ............. 361/679.02 |
| 2005/0110645 A1 | | 5/2005 | Boyden |
| 2007/0103318 A1 | | 5/2007 | Boyden |
| 2011/0313576 A1 | * | 12/2011 | Nicewonger .................. 700/282 |

FOREIGN PATENT DOCUMENTS

| | | |
|---|---|---|
| JP | 2001358487 | 12/2001 |
| KR | 200416819 | 5/2006 |
| KR | 200427610 | 9/2006 |
| KR | 100763648 | 10/2007 |
| WO | 9215993 | 9/1992 |
| WO | 2010146022 | 12/2010 |

\* cited by examiner

*Primary Examiner* — Courtney Smith
(74) *Attorney, Agent, or Firm* — King & Spalding LLP

(57) ABSTRACT

A system for suppressing an overheat condition in an electrical housing includes an electrical housing that defines a housing area including one or more electrical devices; a suppression fluid container containing a suppression fluid; a valve configured to regulate the flow of the suppression fluid from the suppression fluid container to the housing area; at least one sensor configured to sense at least one of temperature and smoke; and a controller communicatively connected to the at least one sensor and the valve, the controller configured to receive signals from the at least one sensor indicating an overheat condition in the housing area; and in response to the received signals indicating the overheat condition in the housing area, control the valve to allow the suppression fluid to flow from the suppression fluid container into the housing area, in order to suppress the overheat condition in the housing area.

19 Claims, 2 Drawing Sheets

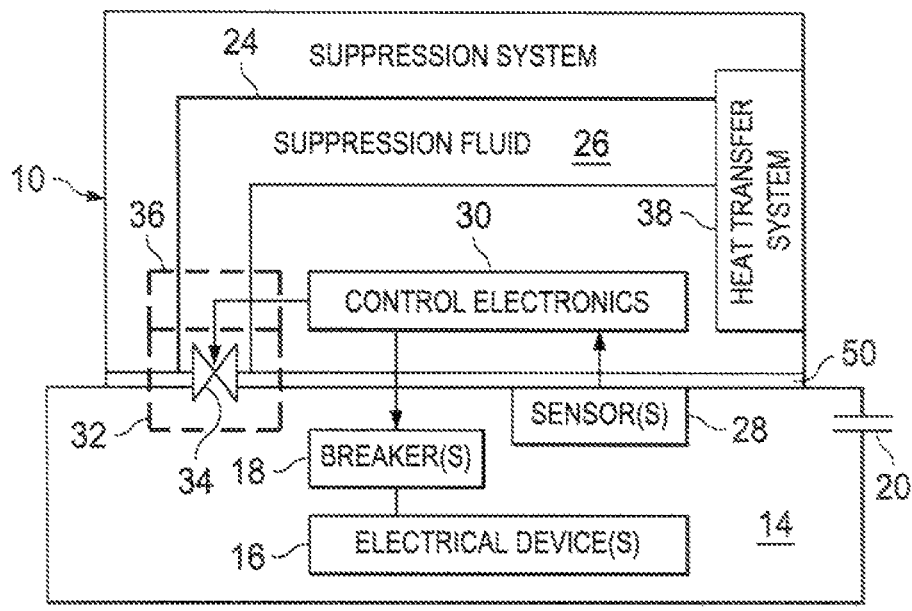
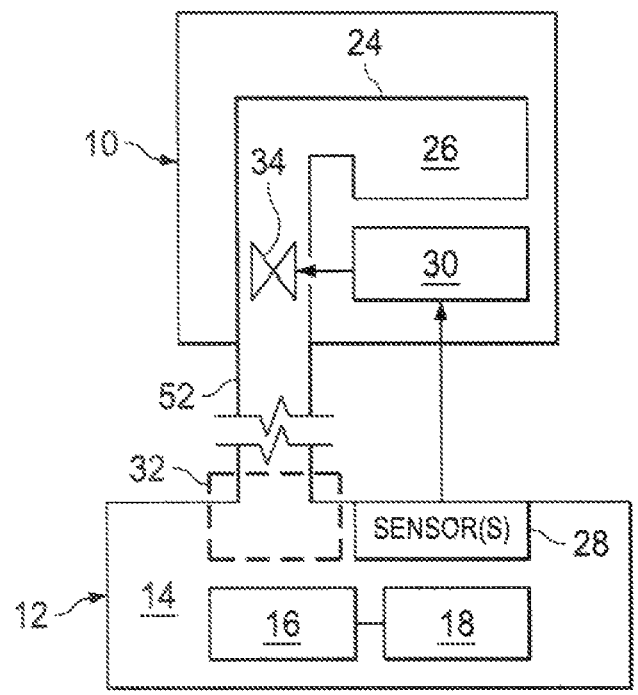
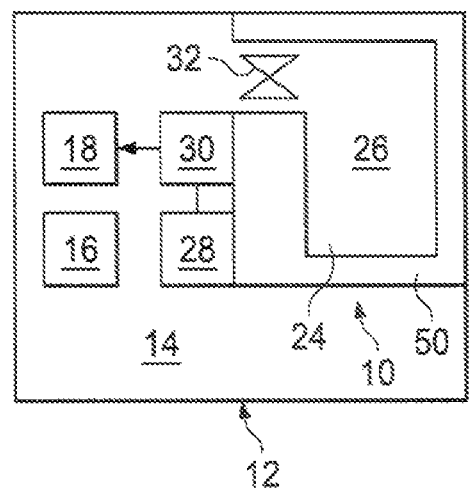

OVERHEAT SUPPRESSION SYSTEMS AND METHODS FOR AN ELECTRICAL HOUSING

TECHNICAL FIELD

The present application relates generally to systems and methods for detecting and suppressing an overheat condition (e.g., a fire or elevated temperature) in an electrical housing, such as a junction box.

BACKGROUND

An electrical junction box is a container for electrical connections, usually intended to conceal them from sight and deter tampering. A small metal, plastic, or fiberglass junction box may form part of an electrical conduit wiring system in a building, may be buried in the plaster of a wall, concealed behind an access panel, cast into concrete, mounted on a roof top, or free standing. The junction box may include terminals for joining wires. A similar container used for joining wires to electrical switches or sockets is called a pattress.

Because junction boxes and other similar enclosures are used to house electrical connections, they are a common source of fires. Thus, fireproofing may be provided around the incoming or outgoing wires or cables and may cover the junction box to help prevent short circuits inside the box during an accidental fire. Further, various techniques have been attempted to reduce the spread of a fire starting in a junction box or other electronics enclosure, or to prevent a fire external to a junction box or other electronics enclosure from spreading into the enclosure. Such techniques include using intumescent or meltable coatings or paints that expand or melt at elevated temperatures to cover ventilation openings, thus extinguishing a fire by starving it of oxygen. In addition, typical junction boxes have no disconnecting means, which renders it difficult to suppress or extinguish DC arcing and/or fired, which often poses a threat to first responders.

SUMMARY

Some embodiments of the invention provide systems and methods for detecting and suppressing an overheat condition (e.g., fire, smoke, or a temperature above a defined threshold) in an electrical housing, such as a junction box or any other enclosure or housing for one or more electrical devices. In general, the systems and methods include one or more sensors (e.g., temperature and/or smoke sensors) for detecting an overheat condition in the electrical housing, and a triggering mechanism for delivering an overheat suppression fluid into the electrical housing to suppress the overheat condition.

In one aspect of the invention, a system for suppressing an overheat condition in an electrical housing is provided. The system includes an electrical housing that defines a housing area including one or more electrical devices; a suppression fluid container connected to the electrical housing and containing a suppression fluid; a valve configured to regulate the flow of the suppression fluid from the suppression fluid container to the housing area; at least one sensor configured to sense at least one of temperature and smoke; and a controller communicatively connected to the at least one sensor and the valve, the controller configured to: receive signals from the at least one sensor indicating an overheat condition in the housing area; and in response to the received signals indicating the overheat condition in the housing area, control the valve to allow the suppression fluid to flow from the suppression fluid container into the housing area, in order to suppress the overheat condition in the housing area.

In another aspect of the invention, a method for suppressing an overheat condition in an electrical housing is provided. The method includes receiving signals from at least one sensor indicating an overheat condition in a housing area of an electrical housing, the housing area including one or more electrical devices; and in response to receiving the signals indicating the overheat condition in the housing area, controlling a valve between a suppression fluid container and the electrical housing to allow suppression fluid to flow from the suppression fluid container into the housing area in order to suppress the overheat condition in the housing area.

BRIEF DESCRIPTION OF THE DRAWINGS

FIG. 1 illustrates an example overheat suppression system coupled to the outside of an electrical housing, according to some embodiments;

FIG. 2 illustrates an example configuration in which an overheat suppression system is spaced apart from an electrical housing, according to some embodiments;

FIG. 3 illustrates an example configuration in which an overheat suppression system is located within an electrical housing, according to some embodiments.

DETAILED DESCRIPTION OF EXEMPLARY EMBODIMENTS

Figure 4:
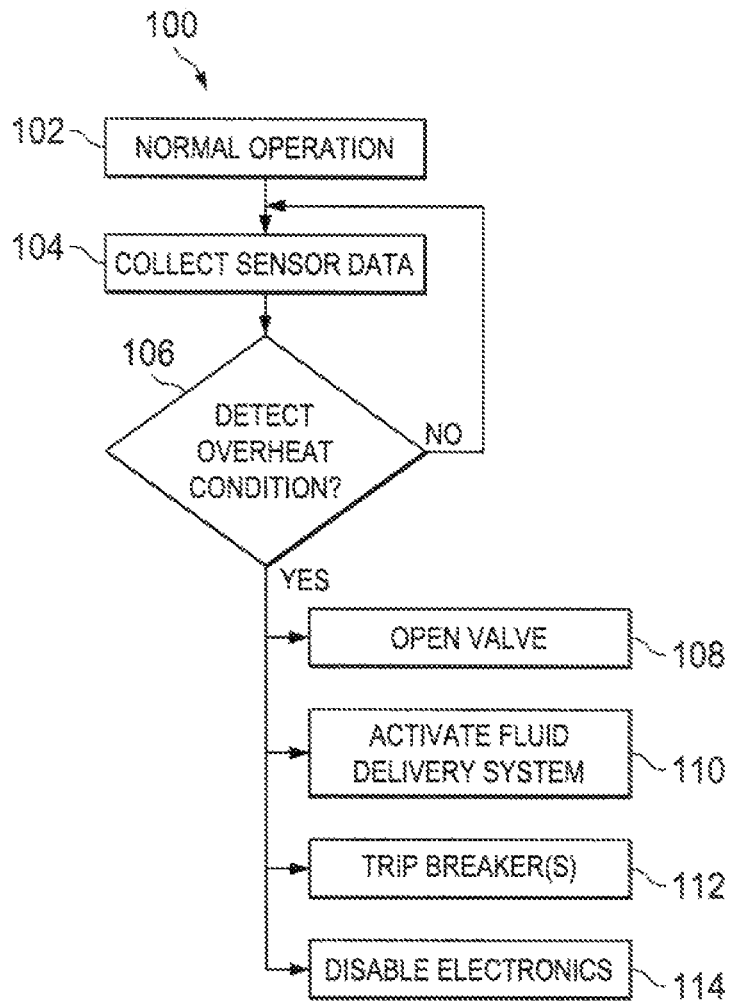
FIG. 4 shows an example method of suppressing an overheat condition in an electrical housing, according to certain embodiments.

The invention may be better understood by reading the following description of non-limitative, exemplary embodiments with reference to the attached drawings wherein like parts of each of the figures are identified by the same reference characters.

The invention relates to systems and methods for detecting and suppressing an overheat condition in an electrical housing, e.g., a junction box or any other enclosure or housing for one or more electrical devices. In general, the systems and methods disclosed herein include one or more sensors (e.g., temperature and/or smoke sensors) for detecting an overheat condition in an electrical housing (e.g., a junction box), and a triggering mechanism for delivering an overheat suppression fluid into the electrical housing to suppress the overheat condition. An "overheat condition" may include a fire, smoke, or a temperature exceeding an overheat threshold. An overheat condition may originate from inside the electrical housing (e.g., due to arcing or an overheated electrical component), or may originate outside the electrical housing and spread or attempt to spread into the electrical housing. Further, the term "electrical device" includes any electronics, electrical circuit elements, or electrical conductor (e.g., wiring or electrical connectors). The systems and methods discussed herein may be used with electrical devices operating on, or carrying, either A/C or DC current.

FIG. 1 illustrates an example overheat suppression system 10 coupled to an electrical housing 12 according to some embodiments. Electrical housing 12 defines a housing area 14 that houses any one or more electrical devices 16 and/or circuit breakers 18. Electrical housing 12 may be any type of housing for one or more electrical devices, e.g., a junction box, a circuit breaker box, a service panel, a fuse box, or any other type of housing. Electrical housing 12 may be substantially enclosed on all sides, open on one side, open on two sides, or otherwise configured. In some embodiments, electrical housing 12 may be substantially enclosed on all sides but may include one or more apertures 20 for allowing air to be forced out of housing area 14 upon a suppression fluid being delivered to housing area 14, as discussed above.

Overheat suppression system 10 may include a suppression fluid container 24 containing a suppression fluid 26, one or more sensors 28, control electronics 30, a connection system 32, a valve 34, a suppression fluid delivery system 36, and a heat transfer system 38. Suppression fluid 26 may comprise any fluid suitable for suppressing or reversing an overheat condition, e.g., by extinguishing fire and/or cooling housing area 14. As used herein, the term "fluid" means any substance that may flow or be dispersed, such as a gas, liquid, foam, gel, powder, or other particulates, for example, for example. Suppression fluid 26 may be non-conductive and non-combustible. In some embodiments, e.g. embodiments in which suppression system 10 is located above electrical housing 12, suppression fluid 26 may be more dense than air and/or oxygen, such that suppression fluid 26 flows downward into and through electrical housing 12, displacing the air in electrical housing 12 upwards and in some embodiments, out through one or more apertures 20 (e.g., apertures 20 located in a top surface or otherwise towards the top of electrical housing 12). Some examples of suppression fluid 26 include NOVEC™ 1230 fluid by 3M™ (fluorinated ketone), FM-200 (heptafluoropropane), FE-13 (fluoroform), argon, nitrogen, potassium carbonate, potassium bicarbonate, potassium nitrate, monoammonium phosphate, sodium bicarbonate, carbon dioxide, synthetic detergent, polysaccharide, fluoroakyl suffaccant, 2,2-dichloro-1,1,1-trifluoroethane, and water. Suppression fluid 26 may also include any combination of two or more different fluids, in any suitable ratio.

Sensor(s) 28 may be configured to sense at least one of temperature and smoke in housing area 14, and communicate signals to control electronics 30. For example, overheat suppression system 10 may include a temperature sensor, or a smoke detector, or both. Each sensor 28 may be positioned inside electrical housing 12 (e.g., as shown in FIG. 1), outside electrical housing 12 but connected to housing area 14 by an opening in electrical housing 12, on an outside wall of electrical housing 12 and configured to sense the temperature of the outside wall, or otherwise arranged in any suitable manner to sense data indicative of the heat or presence of smoke within housing area 14.

As mentioned above, sensor(s) 28 may be configured to communicate signals to control electronics 30. Control electronics 30 may include any electronics (e.g., one or more microprocessor, microcontrollers, or other circuits) configured or programmed to receive signals from sensor(s) 28 and control one or more components, e.g., suppression system valve 32, breaker(s) 18, and/or electrical device(s) 16, based on the received sensor signals. For example, control electronics 30 may configured to receive signals from sensor(s) 28, determine that such signals indicate an overheat condition in housing area 14, and in response to determining the overheat condition, initiate any or more of the following actions: (a) open valve 34 to allow suppression fluid 26 to flow from suppression fluid container 24 into housing area 14, (b) activate suppression fluid delivery system 36 to facilitate the delivery of suppression fluid 26 from suppression fluid container 24 into housing area 14, (c) trip one or more breakers 18, and/or (d) otherwise turn off or disable one or more electrical devices 16. Thus, in addition to suppressing the overheat condition, control electronics 30 may disconnect a loaded electrical system, which may for example protect downstream hardware from damage.

Control electronics 30 may be programmed with one or more particular algorithms for performing any of the functions discussed above. Such algorithms may define one or more threshold values for determining an overheat condition. For example, an algorithm may define a threshold smoke detector signal value (e.g., a threshold voltage) and/or a threshold temperature or temperature sensor signal value (e.g., a threshold voltage). Control electronics 30 may thus compare smoke detector signals and/or temperature sensor signals to such threshold values for determining an overheat condition.

Valve 34 may comprise any valve suitable to control the flow of suppression fluid 26 from suppression fluid container 24 into housing area 14. Valve 34 may be located in or proximate connection system 32, which couples overheat suppression system 10 to electrical housing 12. Connection system 32 may include any suitable components or devices to permanently or releasably connect overheat suppression system 10 to electrical housing 12. Connection system 32 may include one or more o-rings, gaskets, or other seals to provide a seal between suppression fluid container 24 and electrical housing 12 and/or between suppression fluid container 24 and the ambient environment. In some embodiments, connection system 32 may include one or more spigots, nozzles, or other reduced cross-sectional conduits connected to electrical housing 12 by a sealed connector.

Suppression fluid delivery system 36 may include any components or devices configured to facilitate the delivery and/or dispersing of suppression fluid 26 from suppression fluid container 24 into housing area 14. For example, suppression fluid delivery system 36 may include one or more pumps, fans, jets, spray nozzles, etc. One or more elements of suppression fluid delivery system 36 may be configured for automatic activation by control electronics 30, e.g., in response to a detection of an overheat condition. Suppression fluid delivery system 36 may be located upstream of connection system 32, downstream of connection system 32, or partially or fully within connection system 32.

Heat transfer system 38 may include any passive or active devices for cooling or removing heat from suppression fluid 26 in suppression fluid container 24. For example, heat transfer system 38 may include passive elements such as a heat sink with fins, or active elements such as fans, a heat pump, etc. In some embodiments, heat transfer system 38 maintains suppression fluid 26 cooler than the air in housing area 14.

Some embodiments may omit certain components discussed above. For example, some embodiments do not include suppression fluid delivery system 36 and/or heat transfer system 38. As another example, some embodiments do not provide any control of electrical devices 16 or breakers 18 by overheat suppression system 10.

In some embodiments, suppression fluid container 24 may be thermally separated or insulated from electrical housing 12, in order to reduce heat transfer from heated air in housing area 14 to suppression fluid 26 in container 24 (e.g., in embodiments in which it is preferable to keep suppression fluid 26 at a relatively low temperature. For example, suppression fluid container 24 or overheat suppression system 10 may be physically spaced apart from electrical housing 12. In the configuration shown in FIG. 1, the main volume of suppression fluid container 24 is spaced apart from electrical housing 12. Further, an insulating layer 50 may be provided between overheat suppression system 10 and electrical housing 12 to further insulate suppression fluid 26. Insulating layer 50 may be formed from any suitable thermal insulating material.

FIG. 2 shows an example embodiment in which overheat suppression system 10 is spaced apart from electrical housing 12, which may provide substantially complete thermal isolation between heated air in housing area 14 and suppression fluid 26 in container 24. Overheat suppression system 10 may be located at any suitable distance from electrical housing 12, and suppression fluid container 24 may be coupled to housing area 14 by one or more connection conduits 52, which may be formed from any suitable flexible or rigid material. Sensor 28 may be communicatively connected to control electronics 30 using a wired or wireless connection.

In other embodiments, overheat suppression system 10 may be located inside electrical housing 12. FIG. 3 illustrates an example embodiment in which overheat suppression system 10 is located within electrical housing 12. As shown, suppression fluid container 24 may be coated by or encased within an insulating layer 50.

FIG. 4 shows an example method 100 of suppressing an overheat condition in an electrical housing, according to certain embodiments. At step 102, electronic devices 16 in electrical housing 12 operate according to normal operating conditions, and suppression fluid 26 is maintained in container 24. Periodically (at any suitable frequency), sensor(s) 28 collect data and communicate signals to control electronics 30, as indicated at step 104. At step 106, control electronics 30 determine whether the signals from sensor(s) 28 indicate an overheat condition. For example, control electronics 30 may compare signals from sensor(s) 28 to one or more respective threshold values (e.g., a temperature threshold or a smoke signal threshold).

If control electronics 30 determines there is no overheat condition, the method returns to step 104, and sensor(s) 28 and control electronics 30 continue to collect and analyze data. However, if control electronics 30 determine that the signals from sensor(s) 28 do indicate an overheat condition, control electronics 30 may automatically initiate any or more of the following actions: (a) open valve 34 to allow suppression fluid 26 to flow from suppression fluid container 24 into housing area 14, as indicated at step 108; (h) activate suppression fluid delivery system 36 to facilitate the delivery of suppression fluid 26 from suppression fluid container 24 into housing area 14, as indicated at step 110; (c) trip one or more breakers 18, as indicated at step 112; and/or (d) otherwise turn off or disable one or more electrical devices 16, as indicated at step 114. When the suppression fluid 26 is delivered into housing area 14, air in the housing area 14 may be forced out of electrical housing 12 through one or more apertures 20, which may help extinguish a fire in the housing area 14.

Therefore, the present invention is well adapted to attain the ends and advantages mentioned, as well as those that are inherent therein. The particular embodiments disclosed herein are illustrative only, as the invention may be modified and practiced in different but equivalent manners apparent to those having ordinary skill in the art and having the benefit of the teachings herein. While numerous changes may be made by those having ordinary skill in the art, such changes are encompassed within the spirit and scope of this invention as defined by the appended claims. Furthermore, no limitations are intended to the details of construction or design herein shown. It is therefore evident that the particular illustrative embodiments disclosed above may be altered or modified and all such variations are considered within the scope and spirit of the present invention.

What is claimed is:

1. A system for suppressing an overheat condition in an electrical housing, comprising:
    an electrical housing that defines a housing area including one or more electrical devices;
    a suppression fluid container that houses a suppression fluid, the container being connected to the electrical housing;
    a valve that regulates the flow of the suppression fluid from the suppression fluid container to the housing area;
    at least one sensor that senses at least one of temperature and smoke; and
    a controller communicatively connected to the at least one sensor and the valve, wherein the controller:
        receives signals from the at least one sensor indicating an overheat condition in the housing area; and
        controls, in response to the received signals indicating the overheat condition in the housing area, the valve to allow the suppression fluid to flow from the suppression fluid container into the housing area, in order to suppress the overheat condition in the housing area,
    wherein the electrical housing includes one or more apertures for allowing air to escape from the electrical housing, such that when the suppression fluid flows from the suppression fluid container into the housing area, the suppression fluid forces air in the housing area out through the one or more apertures.

2. The system according to claim 1, wherein the at least one sensor comprises a temperature sensor and a smoke sensor.

3. The system according to claim 2, wherein the controller is configured to control the valve if either (a) signals from the temperature sensor indicate a temperature above a predetermined threshold, or (b) signals from the smoke sensor indicate the presence of smoke.

4. The system according to claim 1, wherein the suppression fluid is non-conductive and non-combustible.

5. The system according to claim 1, wherein the suppression fluid is more dense than air.

6. The system according to claim 1, wherein the suppression fluid comprises fluorinated ketone.

7. The system according to claim 1, wherein the suppression fluid container is located external to the electrical housing.

8. The system according to claim 1, wherein the suppression fluid container is insulated from the electrical housing.

9. The system according to claim 1, wherein the suppression fluid container is spaced apart from the electrical housing.

10. The system according to claim 1, wherein the suppression fluid in the suppression fluid container is maintained cooler than the ambient air in the electrical housing.

11. The system according to claim 1, further comprising a circuit connected to the controller, wherein the controller is configured to automatically break the circuit in response to the received signals indicating the overheat condition.

12. A method for suppressing an overheat condition in an electrical housing, comprising:
    receiving signals from at least one sensor indicating an overheat condition in a housing area of the electrical housing, the housing area including one or more electrical devices;
    in response to receiving the signals indicating the overheat condition in the housing area, controlling a valve between a suppression fluid container and the electrical housing to allow suppression fluid to flow from the suppression fluid container into the housing area, in order to suppress the overheat condition in the housing area,
    wherein the electrical housing includes one or more apertures for allowing air to escape from the electrical housing, such that when the suppression fluid flows from the suppression fluid container into the housing area, the suppression fluid forces air in the housing area out through the one or more apertures.

13. The method according to claim 12, wherein the at least one sensor comprises at least one of a temperature sensor and a smoke sensor.

14. The method according to claim 13, comprising controlling the valve if either (a) signals from the temperature sensor indicate a temperature above a predetermined threshold, or (b) signals from the smoke sensor indicate the presence of smoke.

15. The method according to claim 12, wherein the suppression fluid is non-conductive and non-combustible.

16. The method according to claim 12, wherein the suppression fluid is more dense than air.

17. The method according to claim 12, wherein the suppression fluid comprises fluorinated ketone.

18. The method according to claim 12, further comprising, before allowing the suppression fluid to flow from the suppression fluid container into the housing area, maintaining the suppression fluid in the suppression fluid container cooler than the ambient air in the electrical housing.

19. The method according to claim 12, further comprising automatically breaking a circuit in response to receiving the signals indicating the overheat condition.

* * * * *